United States Patent

Holst et al.

Patent Number: 5,349,911
Date of Patent: Sep. 27, 1994

[54] ASSEMBLY USED IN FARM IMPLEMENTS TO CLEAR MULCH FOR MINIMUM TILLAGE

[75] Inventors: Dean W. Holst, LeClaire, Iowa; Ray Rawson, Farwell, Mich.

[73] Assignee: Unverferth Manufacturing Company, Inc., Kalida, Ohio

[21] Appl. No.: 802,844

[22] Filed: Dec. 6, 1991

[51] Int. Cl.$^5$ .............................................. A01C 5/06
[52] U.S. Cl. ...................................... 111/139; 172/603
[58] Field of Search ............... 111/139, 140, 141, 142, 111/149, 157, 169, 159, 924, 164, 166, 167; 172/190, 191, 540, 542, 548, 549, 550, 556, 742, 744, 504

[56] References Cited

U.S. PATENT DOCUMENTS

| | | | |
|---|---|---|---|
| 325,512 | 9/1885 | Elam | 111/139 X |
| 1,244,982 | 10/1917 | Horst | 172/556 X |
| 1,249,008 | 12/1917 | Bonds, Jr. | 172/556 X |
| 1,916,637 | 7/1933 | Rhodes | 111/139 X |
| 2,790,367 | 4/1957 | Simmons | 172/742 X |
| 3,306,371 | 2/1967 | Bush | 172/540 |
| 3,718,191 | 2/1973 | Williams | 111/140 X |
| 4,116,140 | 9/1973 | Anderson et al. | 111/139 |
| 4,227,581 | 10/1980 | Klotzbach | 111/139 |
| 4,425,973 | 1/1984 | Williams et al. | 111/139 |
| 4,506,609 | 3/1985 | Fuss et al. | 111/52 |
| 4,550,122 | 10/1985 | David et al. | 111/140 X |
| 4,574,715 | 3/1986 | Deitrich, Sr. et al. | 172/657 |
| 4,726,303 | 2/1988 | Degelman et al. | 111/52 |
| 4,785,890 | 11/1988 | Martin | 111/139 X |
| 5,060,585 | 10/1991 | Alexander | 111/157 X |
| 5,129,282 | 7/1992 | Bassett et al. | 111/139 |
| 5,255,617 | 10/1993 | Williams et al. | 172/603 |

Primary Examiner—Randolph A. Reese
Assistant Examiner—Spencer W. Warnick
Attorney, Agent, or Firm—Henderson & Sturm

[57] ABSTRACT

A clearing assembly of a farm implement comprises a clearing wheel having peripheral teeth for clearing mulch and means for attaching the clearing assembly for centrally positioning the clearing wheel in front of a tool of a unit of the farm implement. The clearing assembly has a vertical standard and an arm attached radially to the lower end of the standard. The outer end of the arm is connected to the hub of the Wheel. The upper end of the standard is adjustable vertically and rotatively within the attaching means to position the clearing wheel vertically for minimum penetration of soil and transversely for clearing a path with a centerline directly in front of the tool of the unit.

1 Claim, 2 Drawing Sheets

ASSEMBLY USED IN FARM IMPLEMENTS TO CLEAR MULCH FOR MINIMUM TILLAGE

BACKGROUND OF THE INVENTION

This invention pertains to instruments for clearing mulch from soil in front of tools of farm implements used for minimum tillage. More particularly the present assembly has a single wheel with teeth for engaging mulch. The axis of the wheel is centered over a path of soil being prepared by a respective tool.

Conservation of moisture in soil and more economical farming may be realized by leaving most of the mulch from the stalks or vines of previous crops in place on the soil of fields while the crops of the current year are being planted and tended. Farm equipments, manufactured or modified to prepare soil by minimum tillage, have clearing assemblies to clear residue of former crops from only those small areas or strips that are necessary to have direct access to soil by furrow openers, sprayers and spreaders.

Clearing wheels that are freely rotative and that have teeth for engaging debris have been used in various prior farm implements. A horizontal axis of each of the clearing wheels of the prior implements is at an acute angle horizontally from the direction of travel, and since the clearing wheels are freely rotative on a hub and the teeth engage debris and soil, forward motion of the farm implements rotate the clearing wheels to clear paths by moving debris from the paths of the respective wheels. Satisfactory rotation of the wheels with sufficient force to remove debris transversely is provided by having the horizontal direction of the axes at about 45 degrees from the direction of travel of the implements.

Most of the prior farm implements having clearing wheels to clear debris have been used for removing particular residues from strips of fields in which soil is quite deeply cultivated. A modification of each unit of a multiple row crop planter for minimum tillage farming is shown in U.S. Pat. No. 4,785,890 issued to Howard D. Martin on Nov. 22, 1988. An assembly of a pair of horizontally and oppositely spaced toothed wheels is positioned ahead of a furrow opener of each unit. The toothed or clearing wheels of the assembly penetrate residue and soil at two respective positions spaced in opposite directions from the centerline of a path being cleared by the pair, and each of the wheels move the debris to the respective adjacent edge of the path. Minimum disturbance of soil results from having the wheels penetrate debris and soil only to the extent required to rotate them, and therefore an assembly of two clearing wheels clears a path most thoroughly of debris in lines where the teeth of the wheels penetrate soil, that is, not along the usual centerline traveled by a following tool but along lines spaced from the centerline of the path being cleared.

SUMMARY OF THE INVENTION

According to the present invention, an assembly for clearing residue of crops requires only one wheel with peripheral outward teeth. Means for connecting the assembly to a farm implement positions the axis of the wheel directly above the centerline of a path to be prepared by a tool of the farm implement during its forward movement. In this description, the residue to be cleared is called mulch according to its intended use.

As in the aforementioned U.S. Pat. No. 4,785,890, for the least disturbance of soil, the clearing wheel is to be set at a minimum depth required for rotation thereof by forward movement of the farm implement to which the clearing assembly is attached. By using the present assembly with only one clearing wheel centered in the path being cleared, penetration into mulch and soil is minimal, and importantly, the strip that is most thoroughly cleared is at the center of the path where preparation of soil is most likely concentrated. Since force for rotating the wheel is supplied by contact with mulch in addition to that provided by contact with soil, soil is disturbed only a small amount. When mulch is quite evenly spread, the teeth hardly need to penetrate the soil beneath the axis of a wheel, usually, even less than ½ inch (12.7 mm).

The present assembly for removing mulch from a path for preparation of soil may be used in different farm implements, and the attachment of the assembly to the various implements can be understood from the accompanying drawing and the detailed description for attaching the clearing assembly to row crop planters. Often, a coulter is required to cut long pieces of residue of crops to define edges of the path being cleared and to provide leveling for a pair of gauge wheels that determine the level of a tool that is preparing soil in the center of the path. Usually, the clearing assembly is attached to a unit of a multiple row farm implement such that the center of the clearing wheel is directly in front of a tool preparing soil. If the location of the soil being prepared is a short distance from the actual hardware of the tool, the clearing wheel is positioned with respect to the location of soil being prepared, the preparation of soil being defined herein as the cultivation or the application of material for growing crops.

DESCRIPTION OF THE PREFERRED EMBODIMENTS

Figure 1:
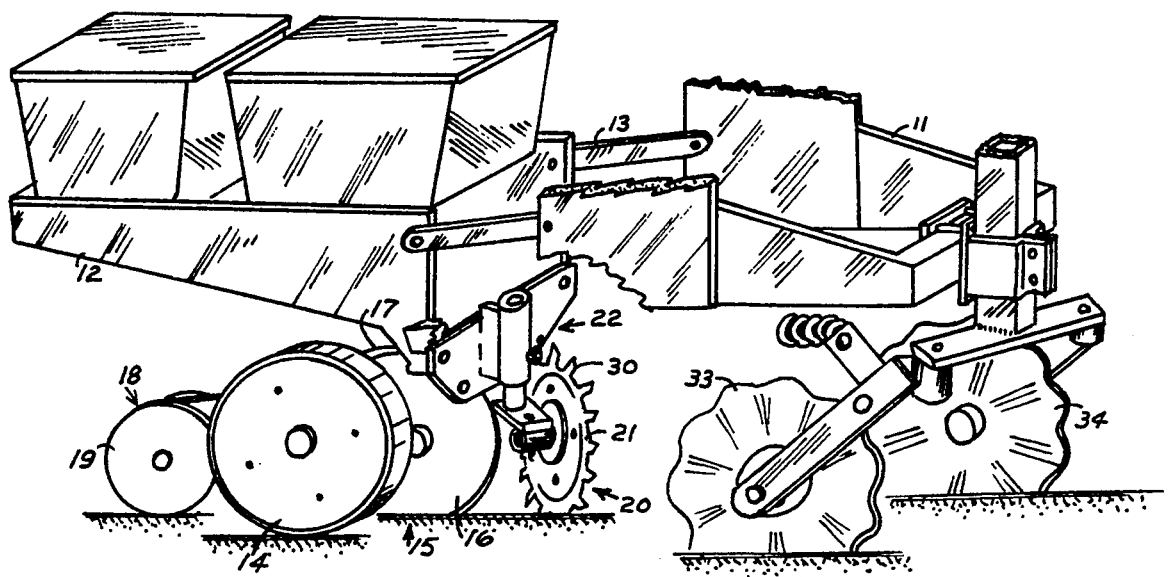
FIG. 1 is a fragmented, simplified perspective view of a typical unit of a multiple row planter with a clearing assembly of this invention attached.

Without the clearing assembly of this invention and the often desirable coulters, the unit of a row planter shown in FIG. 1 is a typical unit of a farm implement. A frame assembly comprises a front coulter frame 11 and a rear planter frame 12, the rear side portions of the coulter frame 11 being connected to the front side portions of the planter frame 12 by four parallel arms 13. During operation, the parallel arms 13 permit the planter assembly supported by the planter frame 12 to seek a level determined by a pair of gauge wheels as indicated by the gauge wheel 14. At the level determined by the gauge wheels 14, a furrow opener 15 comprising disks 16 and 17, a furrow closing means such as a pair of pinch wheels 19 and in this improved equipment, a clearing assembly 20 are at their optimum heights for planting.

Figure 2:
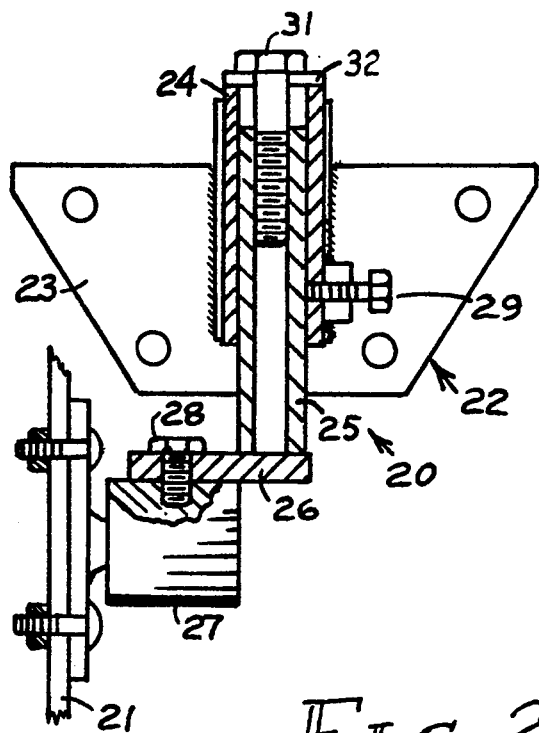
FIG. 2 is a cross-sectional view of linkage of the clearing assembly to be attached to a farm implement.

Attaching and positioning means for positioning a clearing wheel 21 of the clearing assembly 20 in line ahead of the furrow opener 15 is shown in FIG. 2. A bracket 22 has a steel plate 23 with suitable holes to receive bolts for fastening the plate 23 across the lower, front portion of the planter frame 12 as shown in FIG. 1. A collar 24 receives a round standard 25 and is welded across the center of the plate 23 for positioning the standard vertically ahead of the line of travel of the furrow opener 15.

The lower end of the standard 25 is welded perpendicularly to one end of an arm 26 that is to be rotated within the collar 24 for moving the clearing wheel transversely with respect to the line of travel of the planter unit. The hub 27 of the clearing wheel 21 is connected by a bolt 28 approximate the opposite end of the arm 26. The bolt 28 extends vertically through the arm 26 into a radial threaded hole of the hub 27 such that the hub contacts the lower side of the arm 26.

To confine penetration of the teeth of a clearing wheel to the center of a path in line with the furrow opener of FIG. 1 while having the axis of the hub 27 at a desired angle, for example 45 degrees, with respect to the direction of travel, the hub 27 is turned about the loosened bolt 28, and simultaneously or alternately, the arm 26 is turned to rotate the attached standard 25 within the collar 24. The bolt 28 is tightened to secure the hub 27 at the desired angle, and a locking screw 29 is tightened to secure the standard 25. The locking screw 29 may be a conventional machine screw turned in a radial direction into the collar 24 and secured by a locking nut.

Before the locking screw 29 is tightened to retain the standard 25 in the desired angular position, the standard must also be moved vertically to set the height of the clearing wheel 21 to have its teeth 30 penetrate mulch and soil only far enough to ensure rotation during forward travel. While the set screw 29 is loosened, the upper end of the standard 25 could be free to permit positioning the standard both vertically and rotatively by hand, but the adjustment becomes much less arduous with the addition of a height adjustment screw 31 at the top of the collar 24. A ring 32 secured over the top of the bore of the collar 24 has a hole like a washer through which the threaded portion of the screw 31 moves freely. The upper end of the standard 25 is axially, internally threaded to receive the external threads of the adjustment screw 31 so that the height of the standard can be adjusted by turning the screw 31 while the locking screw 29 is loosened. If the clearing assembly 20 is to be used on particular farm equipment to till fields in which stones are prevalent, greater strength can be obtained by welding the hub 27 to the arm 26 at an angle of about 45 degrees.

The clearing wheel 21 is fabricated from 5/16 inch (7.94 mm) steel plate sad is mildly tempered. The diameter of the clearing wheel 21 is determined over a practical range by the condition of the cropland on which it is to be used and by the function of the implement to which it is to be attached. On the planter as described, a suitable diameter is about 13 inches (230 mm) overall. Each of sixteen teeth 30 is about 2½ inches (64 mm) long, somewhat over ½ inch (12.7 mm) wide, is tapered slightly to become narrower in the direction toward its outer end, sad also the outer end is slanted to form an edge that faces the direction of travel as a tooth enters soil. The pivot or bolt 28 connecting the hub 27 to the arm 26 is about 2¼ inches (57 mm) from the center of the clearing wheel 21, and the distance between the bolt 28 and the axis of the standard 25 may be somewhat greater.

Coulters, such as the pair of fluted coulter wheels 33 and 34 of FIG. 1, shown spaced apart transversely but somewhat offset from a direction perpendicular to the direction of travel, are necessary when long pieces of residue need to be cut and leveled for defining the width of a path to be cleared and for providing a smoother track for the gauge wheels 14. These coulter wheels are similar to those shown in U.S. Pat. No. 4,987,841, Coulter Wheel Assembly Including Applying Dry or Liquid Fertilizers, issued to Ray Rawson et al on Jan. 29, 1991. If fertilizer is applied at the location of the coulters as taught in that reference, the use of the present clearing wheel 21 centered in the path being cleared and adjusted to penetrate soil a minimum amount is preferred in order to have less scattering of applied fertilizer than the scattering to be expected by using a prior assembly having multiple clearing wheels.

Figure 3:
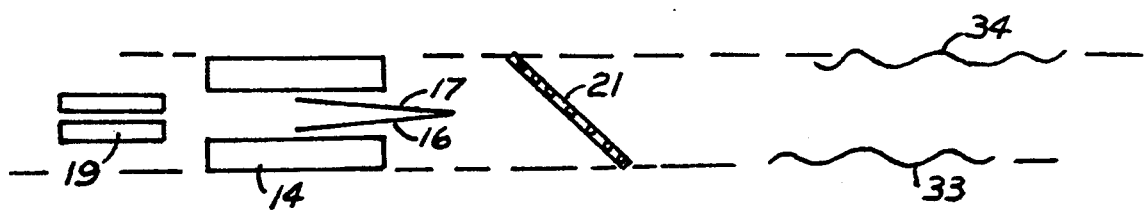
FIG. 3 is a plan view to show the relationship between a path being cleared and those components of FIG. 1 that are in contact with soil.

In FIG. 3, the projected components of a unit of the row planter of FIG. 1 show their relative positions on soil while operating. The coulter wheels 33 and 34 have the outer surfaces of their fluted edges in line with the outside edges of the pair of gauge wheels 14. In these positions, mulch is cut to be removed by the clearing wheel 21, and a smoother track is prepared for the gauge wheels 14. The clearing wheel 21 is set at a 45 degree angle and has its center directly in front of the center of the furrow opener comprising the disks 16 and 17. The furrow opening disks 16 and 17#the gauge wheels 14, and the furrow closing wheels 19 are in a usual arrangement.

We claim:

1. In an assembly for use in conservation tillage over soil having residue of former crops remaining thereon, and including a planting assembly for opening a seed furrow, for depositing seed therein and for closing the coil over the seed; a frame operatively connected to the planting assembly for placement in front of the planting assembly; a unit mounted on the frame and engageable with the soil sufficiently to cut the remaining residue and to define a path therebetween for planting, the path having a centerline extended in plan longitudinally of the unit; a residue clearing device comprising:

rotatable means mounted on the frame between the unit and the planting assembly, said rotatable means disposed angularly across the path;

said rotatable means engageable with the soil sufficient only to move the residue remaining on the path to one side thereof whereby to clear the residue from in front of the planting assembly and further wherein the said rotatable means comprises a single wheel having peripheral outward teeth and rotatable about a generally horizontal axis, and extended angularly in plan completely across the path; said wheel engageable with the soil sufficiently only to provide rotation of said wheel, and said wheel disposed with its center aligned in plan with the centerline of the path, whereby providing minimal penetration into mulch and soil while clearing the center of the path.

* * * * *